US011518507B2

(12) United States Patent
Brewer et al.

(10) Patent No.: US 11,518,507 B2
(45) Date of Patent: Dec. 6, 2022

(54) LINEAR ACTUATOR

(71) Applicant: CLAVERHAM LIMITED, Solihull (GB)

(72) Inventors: Paul Brewer, Bristol (GB); Reg Raval, Bristol (GB)

(73) Assignee: CLAVERHAM LIMITED, Solihull (GB)

( * ) Notice: Subject to any disclaimer, the term of this patent is extended or adjusted under 35 U.S.C. 154(b) by 334 days.

(21) Appl. No.: 16/713,502

(22) Filed: Dec. 13, 2019

(65) Prior Publication Data

US 2021/0114722 A1 Apr. 22, 2021

(30) Foreign Application Priority Data

Oct. 18, 2019 (EP) .................................... 19275102

(51) Int. Cl.
*B64C 27/615* (2006.01)
*B64C 27/72* (2006.01)

(52) U.S. Cl.
CPC ............ *B64C 27/615* (2013.01); *B64C 27/72* (2013.01); *B64C 2027/7266* (2013.01); *B64C 2027/7288* (2013.01)

(58) Field of Classification Search
CPC .................. B64C 27/615; B64C 27/72; B64C 2027/7266; B64C 2027/7288
See application file for complete search history.

(56) References Cited

U.S. PATENT DOCUMENTS

| 5,127,228 | A | 7/1992 | Swenson |
| 5,996,346 | A | 12/1999 | Maynard |
| 6,574,958 | B1 | 6/2003 | MacGregor |
| 9,995,287 | B2 | 6/2018 | Hallila et al. |
| 2013/0336787 | A1* | 12/2013 | Brewer ............... B64C 27/72 416/23 |
| 2018/0142711 | A1* | 5/2018 | Brewer ............... F15B 11/205 |
| 2018/0372134 | A1 | 12/2018 | Brewer et al. |

FOREIGN PATENT DOCUMENTS

| CN | 108791811 A | * | 11/2018 | ............... B64C 3/40 |
| EP | 0869278 A1 | | 10/1998 | |
| EP | 2703288 A1 | | 3/2014 | |
| JP | 02038713 A1 | | 2/1990 | |
| JP | 02290088 A1 | | 11/1990 | |
| WO | 0041501 A3 | | 7/2000 | |

OTHER PUBLICATIONS

European Search Report for European Application No. 19275102.1, Application Filing Date Oct. 18, 2019, dated Apr. 22, 2020, 9 pages.

* cited by examiner

*Primary Examiner* — Richard A Edgar
(74) *Attorney, Agent, or Firm* — Cantor Colburn LLP

(57) ABSTRACT

A linear actuator is provided. The linear actuator comprises: a body; a shaft adapted to move linearly relative to the body; a driver adapted to drive the linear movement of the shaft; and a shape memory alloy component configured to compensate for thermal expansion or contraction of the linear actuator due to a change in temperature thereof.

20 Claims, 5 Drawing Sheets

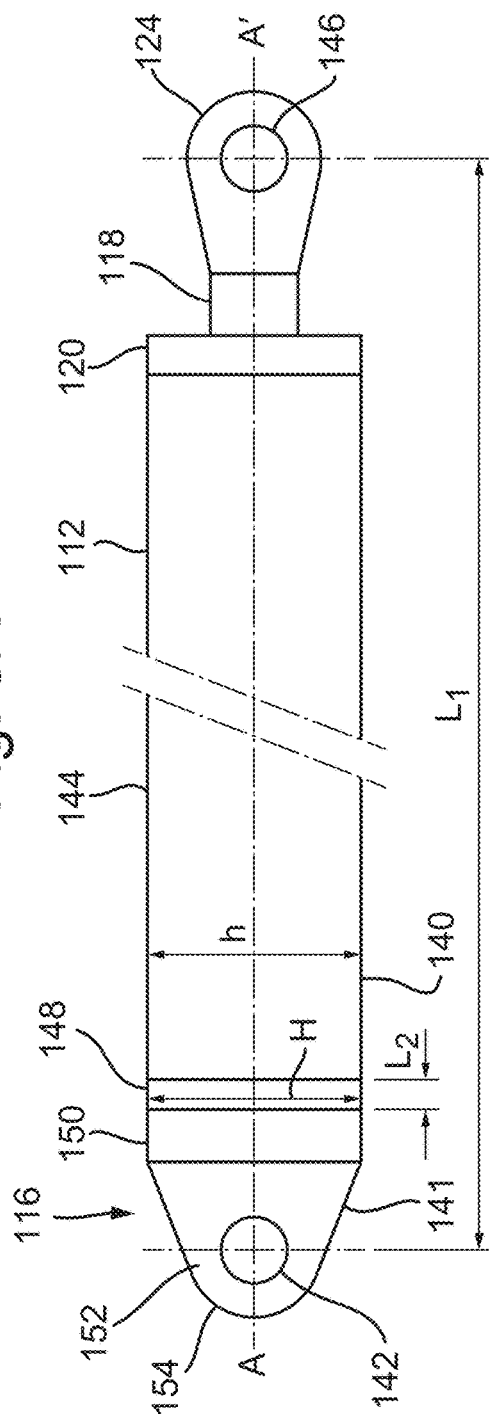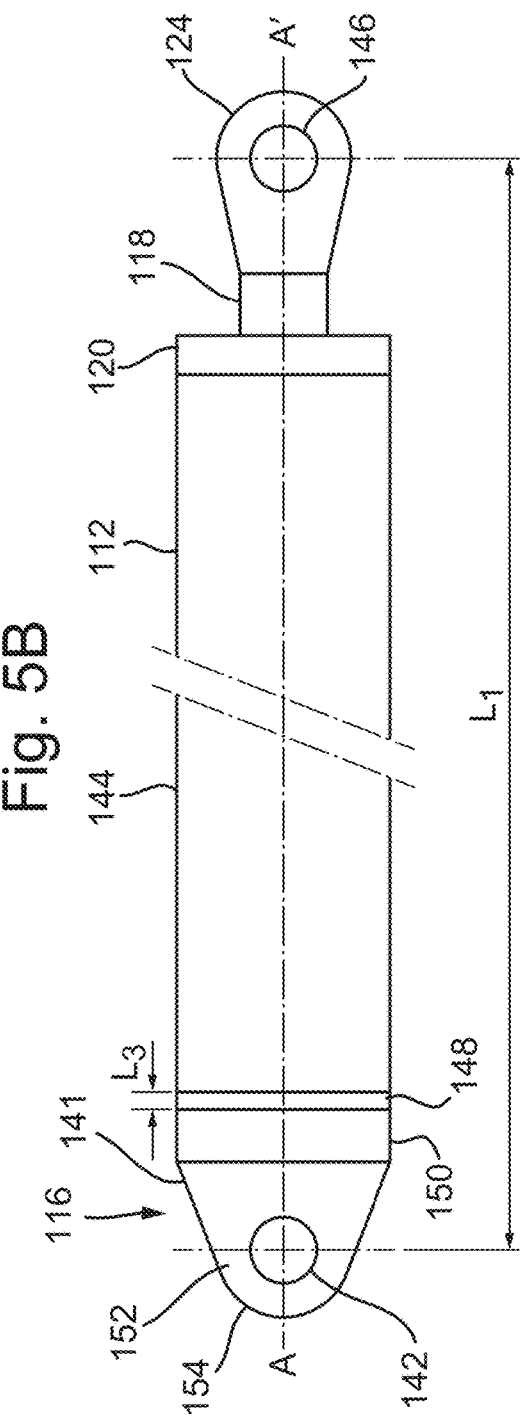

LINEAR ACTUATOR

CROSS-REFERENCE TO RELATED APPLICATIONS

This application claims the benefit of European Application 19275102.2 filed Oct. 18, 2019, the disclosure of which is incorporated herein by reference in its entirety.

TECHNICAL FIELD

The present disclosure relates to linear actuators and in particular to electromechanical linear actuators. Such actuators may be used to actuate control and other surfaces in aircraft, for example slats, flaps, thrust reverser doors and so on.

BACKGROUND

Such actuators typically include an output shaft and a position feedback control system. When used in aircraft or other high integrity servo systems, any expansion or contraction of such actuators due to thermal effects will alter the position of the output shaft when actuated, adversely affecting the position accuracy achieved.

To compensate for the adverse effects of such expansion or contraction, the position feedback control system can be utilised. For example, in an electromechanical linear actuator for actuating a trailing edge flap on a helicopter blade, a feedback system may be provided which measures the position of the trailing edge flap, determines any error in the position of the trailing edge flap and causes the output shaft of the electromechanical linear actuator to move by a desired amount to correct for the error in the position of the trailing edge flap.

While such a feedback system may provide satisfactory operation, the feedback control system can be complex. For example, an additional signal may be required for temperature measurements. This may add complexity to the control algorithm used, resulting in higher costs, size and weight of the linear actuator. In the aerospace industry at least, there is a desire to reduce the size and weight of components used. A reduction in the cost and complexity of components is also desirable.

SUMMARY

From a first aspect of the disclosure, there is provided a linear actuator comprising: a body; a shaft adapted to move linearly relative to the body; a driver adapted to drive the linear movement of the shaft; and a shape memory alloy component configured to compensate for thermal expansion or contraction of the linear actuator due to a change in temperature thereof.

By providing a shape memory alloy component in the linear actuator according to the disclosure, thermal expansion or contraction of the linear actuator may be compensated for without the use of additional systems such as for example, position feedback control systems. Thus, a linear actuator according to the disclosure may be lighter, less complex and/or less expensive to produce than a linear actuator using a position feedback control system to compensate for thermal effects therein.

The shape memory alloy component may be configured to maintain a constant length of the linear actuator over a range of temperatures. The range of temperatures may be from −50° C. to +150° C., or from −10° C. to +110° C. It will be appreciated that the range of temperatures could vary depending on the environment in which the linear actuator is intended to be used.

The linear actuator could take any desired form and the present disclosure is relevant for example to linear actuators comprising a mechanical driver such as a handle and a screw or comprising a hydraulic driver. In one example, the linear actuator may be an electromechanical actuator.

In any example of the disclosure, the driver may comprise an electric motor.

The shape memory alloy component could be fixed to the body by any suitable means. In any example of the disclosure, the shape memory alloy component may be attached to the body by one or more screws. Additionally or alternatively, the shape memory alloy component may be bonded to the body.

In any example of the disclosure, the shape memory alloy component may comprise a spacer extending between a first part of the body and a second part of the body. The first part of the body may comprise a housing. Additionally or alternatively, the second part of the body may comprise an end portion of the linear actuator. It will be appreciated that the shape memory alloy component may be fixed to both the first and the second parts of the body by any suitable means. In the example described, the shape memory alloy component extends between and separates the first and second parts of the body in the direction of movement of the linear actuator.

In any example of the disclosure, the shape memory alloy component may comprise an end portion of the linear actuator. This may be provided additionally to or without the SMA spacer. Thus, in one example, no spacer need be provided extending between the first and second parts of the body.

The linear actuator according to the present disclosure could be used in a number of different applications. For example, in wind turbine blades. In one example, the linear actuator may be used to control a trailing edge flap in a helicopter blade. In accordance with a further aspect of the disclosure, a helicopter rotor blade is provided, the blade comprising: a trailing edge flap; and a linear actuator as described in any of the examples of the disclosure above, wherein the linear actuator is adapted to drive movement of the trailing edge flap.

From a still further aspect of the disclosure, a method of compensating for thermal expansion or contraction of a linear actuator due to a change in temperature thereof is provided, the method comprising: compressing a shape memory alloy component while heating or cooling the component to a desired temperature; and positioning the shape memory alloy component in the linear actuator such that the shape memory alloy component will compensate for thermal expansion or contraction of the actuator due to a change in temperature thereof.

The method may further comprise attaching the shape memory alloy component to the body of the linear actuator using screws and/or bonding the shape memory alloy component to the body of the linear actuator.

In any example of the linear actuator, helicopter rotor blade or method as described above, the shape memory alloy component may be configured to compensate for a change in a linear position of the shaft due to thermal expansion or contraction of the linear actuator.

It will be understood that various shape memory alloys could be used in a linear actuator, a helicopter rotor blade or a method according to the present disclosure. In one example, the shape memory alloy component may comprise Nickel Titanium Alloy.

BRIEF DESCRIPTION OF THE DRAWINGS

Some embodiments of the disclosure will now be described by way of example only with reference to the accompanying drawings in which:

FIG. 5A shows an electromechanical actuator according to the present disclosure at a first temperature;

FIG. 5B shows the electromechanical actuator of FIG. 5A at a second temperature;

DETAILED DESCRIPTION

Figure 1:
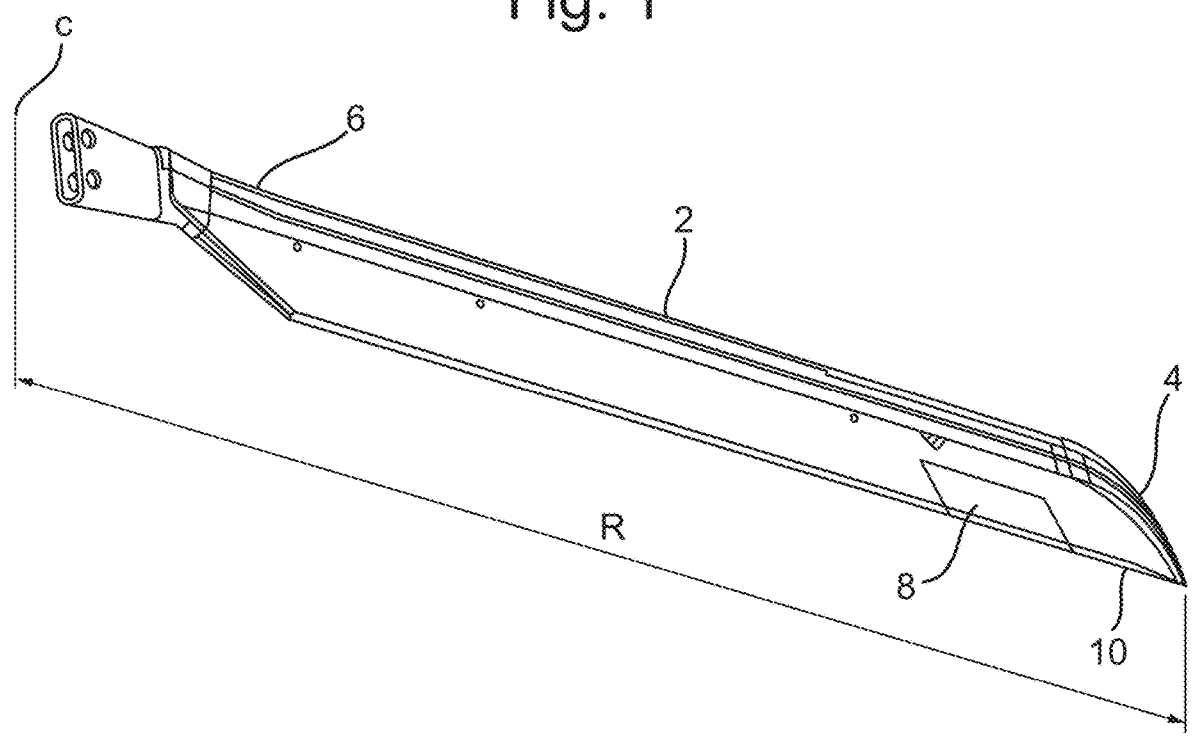
FIG. 1 shows a typical helicopter blade with a trailing edge flap.

With reference to FIG. 1, a helicopter blade 2 to which a linear actuator according to the disclosure may be mounted comprises a tip 4 and a root 6. The blade is adapted to rotate about a centre of rotation C such that the tip 4 of the blade 2 extends a radial distance R from the centre of rotation C.

Figure 2:
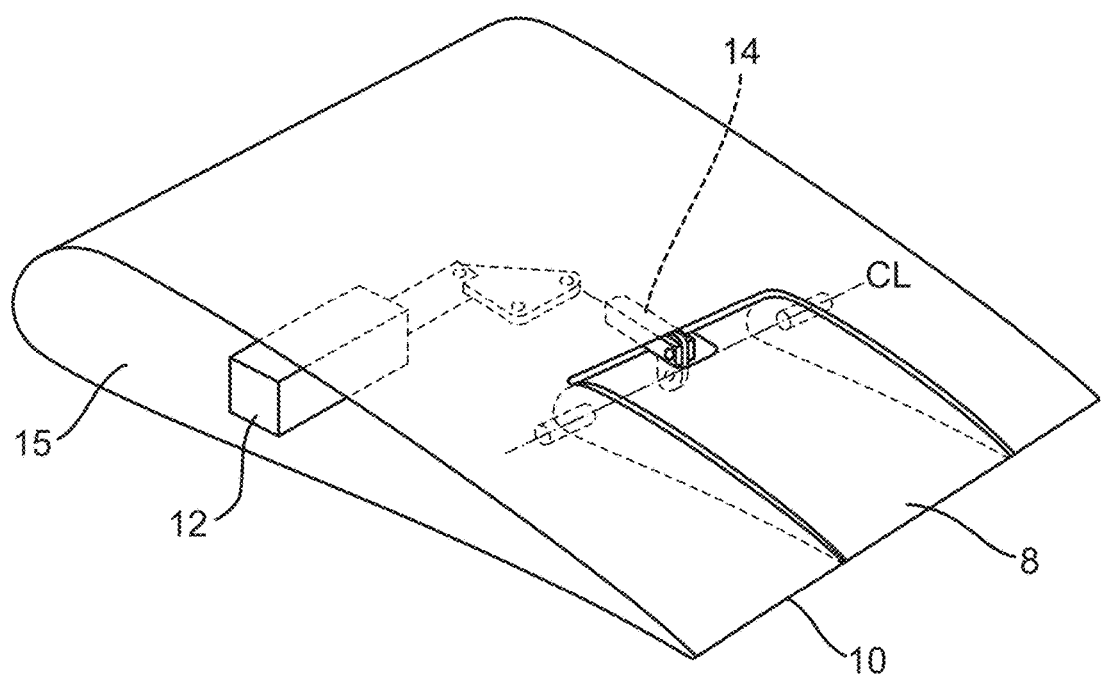
FIG. 2 shows a perspective view of a part of the helicopter blade of FIG. 1.

A trailing edge flap 8 is provided on the trailing edge 10 of the blade 2. As seen in FIG. 2, the trailing edge flap 8 is configured to pivot relative to the blade 2 about a hinge having a centreline CL. An electromechanical linear actuator 12 according to an example of the disclosure is configured to drive the pivoting of the trailing edge flap 8 via a linkage 14. In the example shown, the electromechanical linear actuator 12 is mounted in the interior 15 of the blade 2.

Figure 3:
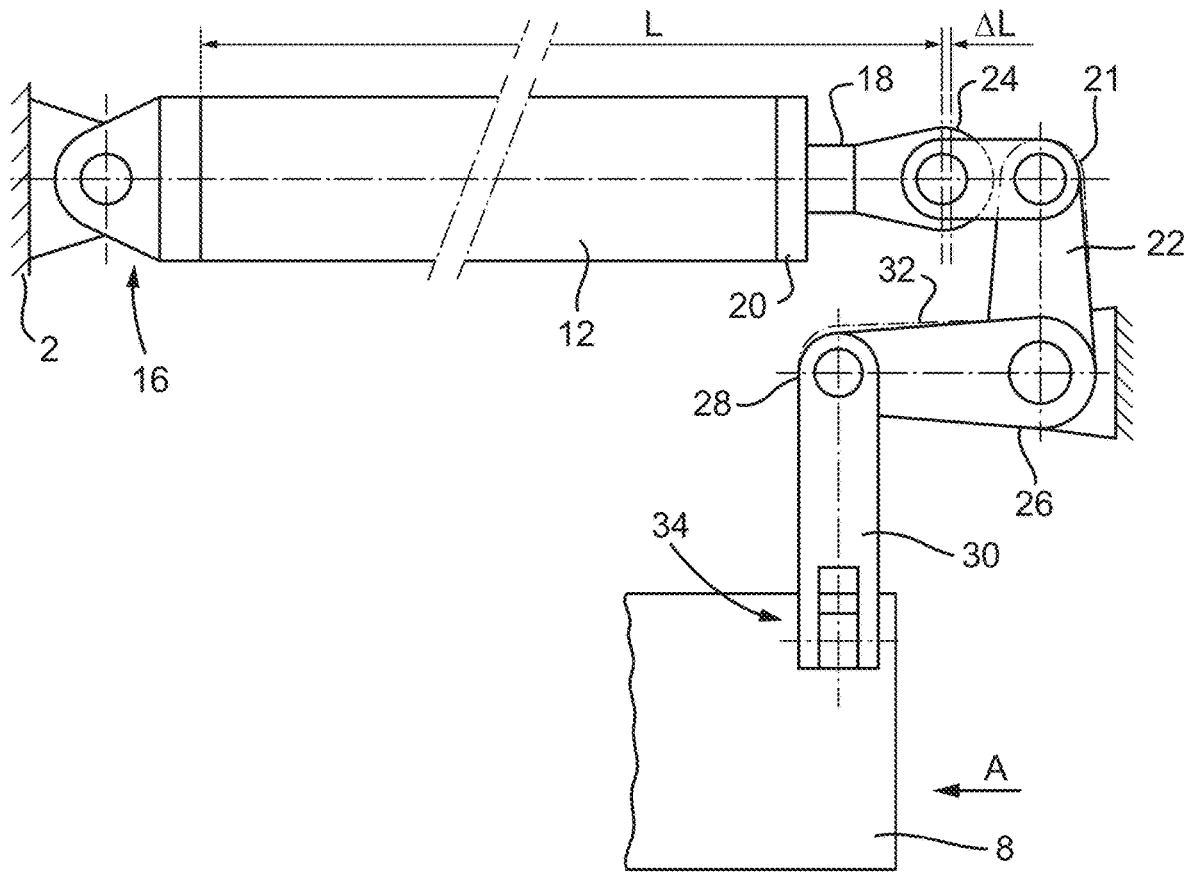
FIG. 3 is a schematic view showing an electromechanical actuator which does not fall within the scope of the invention linked to a trailing edge flap in a helicopter blade.

The linkage 14 is shown schematically in FIG. 3. A first end 16 of the electromechanical actuator 12 is fixed to the helicopter blade 2. An output shaft 18 extends outwardly from a second end 20 of the electromechanical actuator 12 opposite the first end 16. The output shaft 18 is linked to a first end 21 of a bell crank 22 via an output shaft eye end assembly 24. The bell crank 22 extends substantially perpendicular to the output shaft 18. The output shaft eye end assembly 24 is fitted with a spherical bearing (not shown) to allow for rotary motion of the linkages and control surfaces.

A second end 26 of the bell crank 22 is linked to a first end 28 of a drive link 30 by a lever 32. A second end 34 of the drive link 30 is attached to the trailing edge flap 8 and so will cause the trailing edge flap 8 to pivot into or out of alignment with a surface of the blade 2 depending on the position of the output shaft 18.

As seen in FIG. 3, the electromechanical linear actuator 12 has a length L at room temperature. The electromechanical linear actuator 12 comprises a motor (not shown) for driving the output shaft 18. When in use, the motor will cause the temperature of the electromechanical linear actuator 12 to increase. It will be understood that the nature of helicopter rotor control often requires a steady state flap offset position during operation such that the motor is in use most or all of the time. This steady state operation of the electromechanical linear actuator 12 may result in a significant increase in temperature of the electromechanical linear actuator 12. The temperature of the environment surrounding the electromechanical linear actuator 12 may also increase due to external factors.

Figure 4:
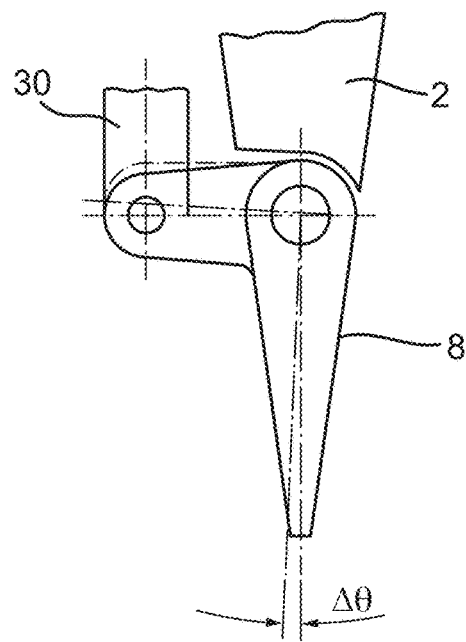
FIG. 4 is a schematic view taken in the direction of arrow A in FIG. 3 showing the trailing edge flap and a part of the link of FIG. 3.

Any increase in temperature will cause the electromechanical linear actuator 12 to expand, such that the length L will increase by an amount ΔL. This will have the effect of the output shaft 18 extending by an amount ΔL beyond its desired position when actuated. As shown in FIG. 4, this will cause an offset of Δθ in the desired position of the trailing edge flap 8. Due to the positioning of the electromechanical linear actuator 12 within the blade 2 and the high gain provided by the linkage arrangement, even a small increase in length ΔL of the electromechanical linear actuator 12 will cause a significant offset Δθ at the trailing edge flap 8.

It will be understood that the amount by which the electromechanical linear actuator 12 expands at a given temperature will depend on the coefficient of thermal expansion of the material or materials of which the electromechanical linear actuator 12 is made. In the aerospace and aeronautical industries for example, it is often desirable to use light alloy components where possible. These light weight alloys typically have higher coefficients of thermal expansion than other metals such as steel. The thermal offset produced for a given change in temperature may accordingly be higher in linear actuators formed from such light alloy components such as Aluminium alloy than would be the case in linear actuators made of other metals such as steel.

One possible means of correcting for the undesired offset Δθ is to provide a feedback control system in which the position of the output shaft 18 is adjusted to compensate for a measured offset from the desired position of the trailing edge flap 8. It will be appreciated however that this requires additional systems to be provided in the electromechanical linear actuator 12 thus increasing the complexity, cost and weight of the system to be used. Additionally, the feedback control system will require additional current to be supplied to the motor of the actuator in order to move the shaft, thus increasing the temperature of the electromechanical linear actuator 12 further. This will in turn cause the electromechanical linear actuator 12 to expand further, necessitating further adjustments to the position of the output shaft 18 to be made.

The electromechanical linear actuator according to the present disclosure provides an alternative solution to the problem of thermal expansion of the electromechanical linear actuator.

FIG. 5A shows an electromechanical actuator 112 according to the present disclosure at a first, ambient temperature. The electromechanical actuator 112 comprises a body 140. The body 140 may comprise a housing 144 having a longitudinal axis A-A' and a rectangular cross section perpendicular to the longitudinal axis A-A'. In alternative examples, the housing may have a square cross section or may be cylindrical, having a circular cross section. The body 140 may also comprise an end portion 141 provided at a first end 116 of the body 140.

A shape memory alloy (SMA) component (in the example shown, an SMA spacer 148) is provided extending coaxially with and between the end portion 141 and the housing 144.

In one example, the SMA component may be formed from Nickel Titanium Alloy although it will be appreciated that other materials having the desired properties could also be used. In the example shown, the housing 144 may have a rectangular cross section with a height h and a width w (see FIG. 5C). The SMA spacer 148 may have a rectangular cross section corresponding to the rectangular cross section of the housing 144. Thus, the height H of the SMA spacer 148 may be equal to the height h of the housing 144. The width W of the SMA spacer 148 may also be equal to the width w of the housing 144. In an alternative example (not shown), the SMA spacer could have a different cross section and/or different dimensions to those of the housing. Thus, in one example (not shown), the height and the width of the SMA spacer could be less than the height and the width of the housing 144 such that the SMA spacer was arranged internally of the outer surface of the housing 144 when in situ. In one example, the SMA spacer 148 may be retained to the electromechanical actuator 112 by one or more screws (not shown) extending into the housing 144 and the end portion 141 respectively. In an alternative example, the SMA spacer 148 may be bonded between the housing 144 and the end portion 141.

Figure 5C:
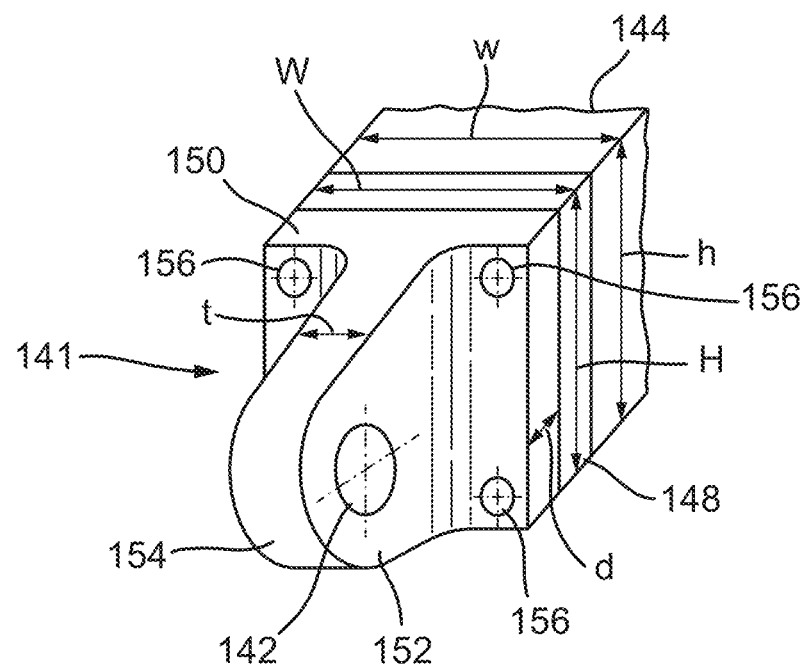
FIG. 5C shows an end portion of an electromechanical actuator according to the present disclosure having a square cross section.

In the example shown in FIGS. 5A, 5B and 5C, the end portion 141 may comprise an attachment portion 150 having a depth d and the same rectangular cross section as that of the housing 144 and the SMA spacer 148. An earth end portion 152 may extend outwardly from the attachment portion 150. The earth end portion 152 is tapered so as to reduce in height as it extends away from the attachment portion 150. The earth end portion 152 may also have a thickness t in the direction of the width w of the housing 144. The thickness t may be less than the width w of the housing 144 and the earth end portion 152 may be positioned to allow connecting elements such as screws (not shown) to be passed through apertures 156 in the attachment portion 150 at each corner thereof on either side of the earth end portion 152. The earth end portion 152 has a rounded tip 154 at the tapered end thereof and is formed with an eye or aperture 142 there through to allow for attachment of the electromechanical actuator 12 to the blade 2.

Figure 5D:
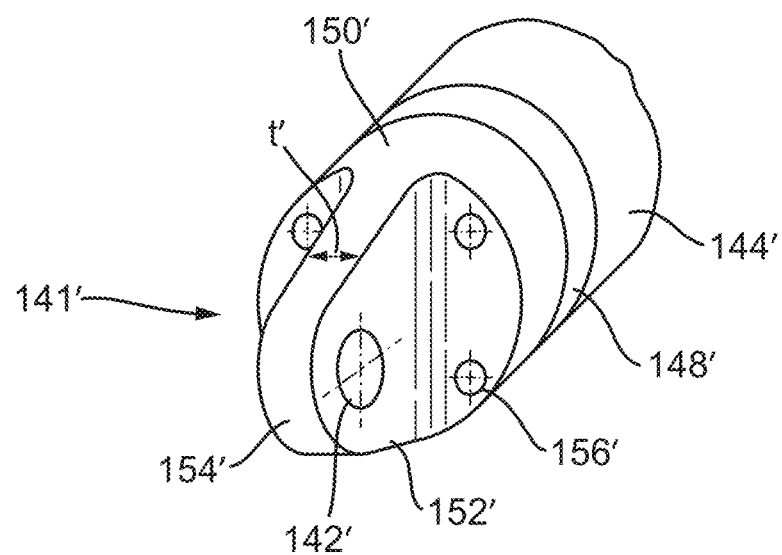
FIG. 5D shows an end portion of an electromechanical actuator according to the present disclosure having a circular cross section.

In the alternative example of FIG. 5D in which the housing 144' has a cylindrical cross section, the SMA spacer 148' may comprise a disc. The end portion 141' may comprise an attachment portion 150' having a diameter (not shown) and the same cylindrical cross section as that of the housing 144' and the SMA spacer 148'. An earth end portion 152' may extend outwardly from the attachment portion 150'. As in the example of FIG. 5C, the earth end portion 152' is tapered so as to reduce in height as it extends away from the attachment portion 150'. The earth end portion 152' may also have a thickness t' such that the earth end portion 152' may be positioned to allow connecting elements such as screws (not shown) to be passed through apertures 156' in the attachment portion 150' at each corner thereof on either side of the earth end portion 152'. The earth end portion 152' has a rounded tip 154' at the tapered end thereof and is formed with an eye or aperture 142' there through to allow for attachment of the electromechanical actuator 12 to the blade 2.

Figure 6:
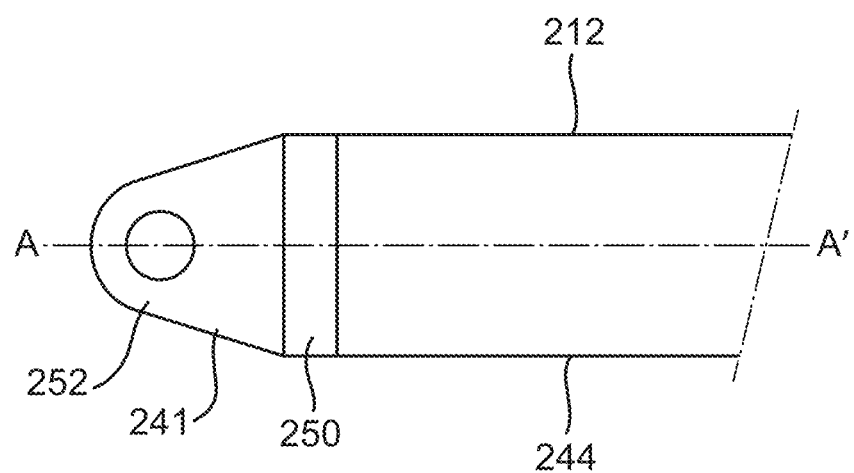
FIG. 6 shows part of an electromechanical actuator according to an alternative example of the present disclosure.

In an alternative example of the disclosure which is shown in FIG. 6, no SMA spacer may be provided but rather the end portion 241 may comprise the SMA component, i.e. the end portion may be made of an SMA material. In this example, the end portion 241 may be retained to the electromechanical actuator 212 by one or more screws (not shown) extending from the attachment portion 250 into the housing 244 or the end portion 241 may be bonded to the housing 244. All other components of the example of FIG. 6 are as in the example of FIGS. 5A and 5B and so are not described further here.

In any of the examples described above, the SMA component is treated prior to assembly in the electromechanical actuator 112 such that the length (along axis A-A') of the component will decrease as the temperature thereof increases. To achieve this, the SMA component is mechanically deformed or compressed along its length while being heated to the maximum temperature that it will reach during operation of the electromechanical actuator 112. Thus, the SMA component may be configured to compensate for thermal expansion effects in the electromechanical actuator 112 over the full operational temperature range thereof.

The electromechanical actuator 112 of FIGS. 5A and 5B is described further below. As seen the electromechanical actuator 112 comprises an output shaft 118. The output shaft 118 is adapted to move linearly relative to the body 140 and extends outwardly along the longitudinal axis A-A' from a second end 120 of the body 140 opposite the first end 116 thereof.

The electromechanical actuator 112 comprises a driver (not shown) for driving movement of the output shaft 118. In the example shown, the driver may comprise a brushless motor (not shown) which is provided internally of the housing 144. The brushless motor may drive a roller screw assembly (also not shown) which in turn drives the linear movement of the output shaft 118. If required, the housing 144 may also house a position feedback assembly (not shown) which may comprise an LVDT or potentiometer (not shown).

As in the electromechanical linear actuator 12 of FIG. 3, the output shaft 118 may be used in a helicopter blade and may be linked to the first end of a bell crank (not shown) via an output shaft eye end assembly 124. The output shaft eye end assembly 124 is fitted with a spherical bearing (not shown) to allow for rotary motion of the linkages and control surfaces. The spherical bearing may also accommodate misalignment between hard mounting points on the helicopter.

At the ambient temperature as shown in FIG. 5A, the electromechanical linear actuator 112 has a total length L1, where the total length L1 is measured from the centre of the aperture 142 in the end portion 141 to the centre of the aperture 146 in the output shaft eye end assembly 124. At the ambient temperature and as shown in FIG. 5A, the SMA spacer 148 will have a length, i.e. a measurement along the axis A-A', of L2.

FIG. 5B shows the electromechanical linear actuator 112 at a second higher temperature corresponding to the steady state operating temperature of the electromechanical linear actuator 112. As shown in FIG. 5B, the total length L1 of the electromechanical linear actuator 112 is the same as at the lower ambient temperature shown in FIG. 5A. As will be understood from the above description, at the higher steady state operating temperature, the length of the SMA spacer 148 decreases to a length L3, where L3 is less than L2. It will be appreciated that as the total length L1 of the electromechanical linear actuator 112 is the same at both the ambient temperature and the higher steady state operating temperature, the SMA spacer 148 is configured to reduce in length at the same rate and by the same amount as the increase in length of the electromechanical linear actuator 112 due to thermal expansion effects.

Thus, the SMA spacer is configured such that the difference $\Delta L_{Thermal}$ between the length of the SMA spacer 148 at ambient temperature, L2 and the length of the SMA spacer 148 at the higher steady state operating temperature, L3 corresponds to the increase in the length of the non SMA parts or components of the electromechanical linear actuator 112 due to thermal expansion at the higher steady state operating temperature.

In one example of a linear actuator according to the disclosure, the electromechanical actuator 112 may be made of aluminium. Additionally or alternatively, one or more individual components of the electromechanical actuator 112, such as the output shaft 118, the end portion 141 or the output shaft eye end assembly 124 may be made of aluminium.

In one example, the length L1 of the electromechanical actuator 112 may be about 12.7 cm or between about 12 cm and 13 cm or between about 11 cm and 14 cm or between about 10 cm and about 15 cm. In a typical aerospace application, the temperature of the electromechanical actuator 112 may vary from about −50° C. to +150° C. or from about −10° C. to about +110° C. In the example described, an increase in temperature from −10° C. to +110° C. would result in a variation in the linear displacement of the output shaft 118 of the electromechanical actuator 112 of about 0.35 mm A method of compensating for such a variation in the linear displacement of a linear actuator, or more generally of compensating for thermal expansion or contraction of a linear actuator due to a change in temperature thereof will now be described with reference to FIGS. 5A and 5B. An SMA spacer 148 is treated prior to assembly in the electromechanical actuator 112 such that the length (along axis A-A') of the component will decrease as the temperature thereof increases. To achieve this, the SMA component is mechanically deformed or compressed while being heated to the maximum temperature that it will reach during operation of the electromechanical actuator 112. In one example therefore, the SMA component may be heated to +110° C.

After it has been treated, the SMA spacer 148 may be inserted into the electromechanical actuator 112. In the example shown, the SMA spacer 148 is first attached to an end of the housing 144 using one or more screws extending from the housing 144 into the SMA spacer 148. In an alternative example, the SMA spacer 148 may be bonded to the housing 144. The end portion 141 of the body 140 is then attached to the SMA spacer by one or more screws extending from the end portion 141 into the SMA spacer 148. In an alternative example, the end portion 141 may be bonded to the SMA spacer 148.

It will be appreciated that the description above is of examples of the disclosure and that various modifications may be made to those examples within the scope of the disclosure. For example, an SMA component could be configured to compensate for thermal contraction of a linear actuator to be used at lower than ambient operating temperatures. Further, the SMA component could be provided in a different part of the electromechanical actuator. For example, the housing 144 could be formed in two parts and an SMA spacer could be provided extending between and coaxially with the two parts of the housing.

From the above, it will be seen that the disclosed actuator has a number of significant advantages over conventional actuators. By providing a shape memory alloy component configured to compensate for thermal expansion or contraction of the linear actuator due to a change in temperature thereof, flap position errors due to thermal effects may be reduced, thus improving rotor performance.

Further, the complexity of the linear actuator control system can be reduced as the control system may not be required to compensate for thermal effects. Because of this, the provision of additional current to an electromechanical linear actuator to compensate for thermal effects may also not be required, thus avoiding additional heating of the electromechanical actuator and the further thermal effects (i.e. expansion or contraction) that would result from the additional heating due to the provision of additional current.

Still further, the linear actuator of the disclosure allows for the use of lightweight components and assemblies, as is particularly desirable in the aeronautical industry.

It will also be appreciated that although the linear actuator may comprise an electromechanical actuator in which the driver comprises a motor, the invention of the disclosure is also relevant to other types of linear actuators such as pneumatic linear actuators. Further, although described in relation to helicopter blades and trailing edge flap actuation, the linear actuator according to the disclosure could be used in many other applications such as, for example, wind turbines, gas turbine engines or nuclear control systems where such systems are exposed to high temperature variations.

What is claimed is:

1. A linear actuator comprising:
   a body;
   a shaft adapted to move linearly relative to the body;
   a driver adapted to drive the linear movement of the shaft; and
   a shape memory alloy component configured to compensate for thermal expansion or contraction of the linear actuator due to a change in temperature thereof;
   wherein the linear actuator is an electromechanical actuator;
   wherein the driver comprises an electric motor; and
   wherein the shape memory alloy component comprises a spacer extending between a first part of the body and a second part of the body.

2. A linear actuator as claimed in claim 1, wherein the shape memory alloy component is configured to maintain a constant length of the linear actuator over a range of temperatures.

3. A linear actuator as claimed in claim 2, wherein the range of temperatures is from −50° C. to +150° C.

4. A linear actuator as claimed in claim 2, wherein the range of temperatures is from −10° C. to +110° C.

5. A linear actuator as claimed in claim 1, wherein the shape memory alloy component is attached to the body by one or more screws.

6. A linear actuator as claimed in claim 1, wherein the shape memory alloy component is bonded to the body.

7. A linear actuator as claimed in claim 1, wherein the first part of the body comprises a housing.

8. A linear actuator as claimed in claim 1, wherein the second part of the body comprises an end portion of the linear actuator.

9. A linear actuator as claimed in claim 1, wherein the shape memory alloy component is configured to compensate for a change in a linear position of the shaft due to thermal expansion or contraction of the linear actuator.

10. A helicopter rotor blade comprising:
    a trailing edge flap; and
    a linear actuator as claimed in claim 1, wherein the linear actuator is adapted to drive movement of the trailing edge flap.

11. A helicopter rotor blade as claimed in claim 10, wherein the shape memory alloy component is configured to compensate for a change in a linear position of the shaft due to thermal expansion or contraction of the linear actuator.

12. A linear actuator comprising:
a body;
a shaft adapted to move linearly relative to the body;
a driver adapted to drive the linear movement of the shaft; and
a shape memory alloy component configured to compensate for thermal expansion or contraction of the linear actuator due to a change in temperature thereof;
wherein the linear actuator is an electromechanical actuator;
wherein the driver comprises an electric motor; and
wherein the shape memory alloy component comprises an end portion of the linear actuator.

13. A linear actuator as claimed in claim 12, wherein the shape memory alloy component is configured to maintain a constant length of the linear actuator over a range of temperatures.

14. A linear actuator as claimed in claim 13, wherein the range of temperatures is one of: from −50° C. to +150° C.; and from −10° C. to +110° C.

15. A linear actuator as claimed in claim 12, wherein the shape memory alloy component is at least one of: attached to the body by one or more screws; and bonded to the body.

16. A helicopter rotor blade comprising:
a trailing edge flap; and
a linear actuator as claimed in claim 12, wherein the linear actuator is adapted to drive movement of the trailing edge flap.

17. A helicopter rotor blade as claimed in claim 16, wherein the shape memory alloy component is configured to compensate for a change in a linear position of the shaft due to thermal expansion or contraction of the linear actuator.

18. A method of compensating for thermal expansion or contraction of a linear actuator due to a change in temperature thereof, the method comprising:
compressing a shape memory alloy component while heating or cooling the component to a desired temperature;
positioning the shape memory alloy component in the linear actuator such that the shape memory alloy component will compensate for thermal expansion or contraction of the actuator due to a change in temperature thereof;
wherein the linear actuator is an electromechanical actuator;
wherein the driver comprises an electric motor; and
wherein the shape memory alloy component comprises one of:
a spacer extending between a first part of the body and a second part of the body; and
an end portion of the linear actuator.

19. A method as claimed in claim 18, comprising attaching the shape memory alloy component to the linear actuator using screws or bonding the shape memory alloy component to the linear actuator.

20. The method as claimed in claim 19, wherein the shape memory alloy component is configured to compensate for a change in a linear position of the shaft due to thermal expansion or contraction of the linear actuator.

* * * * *